Dec. 4, 1962    T. H. QUEER    3,066,924
AUGER TYPE MINING MACHINES
Filed Sept. 22, 1953    2 Sheets-Sheet 1
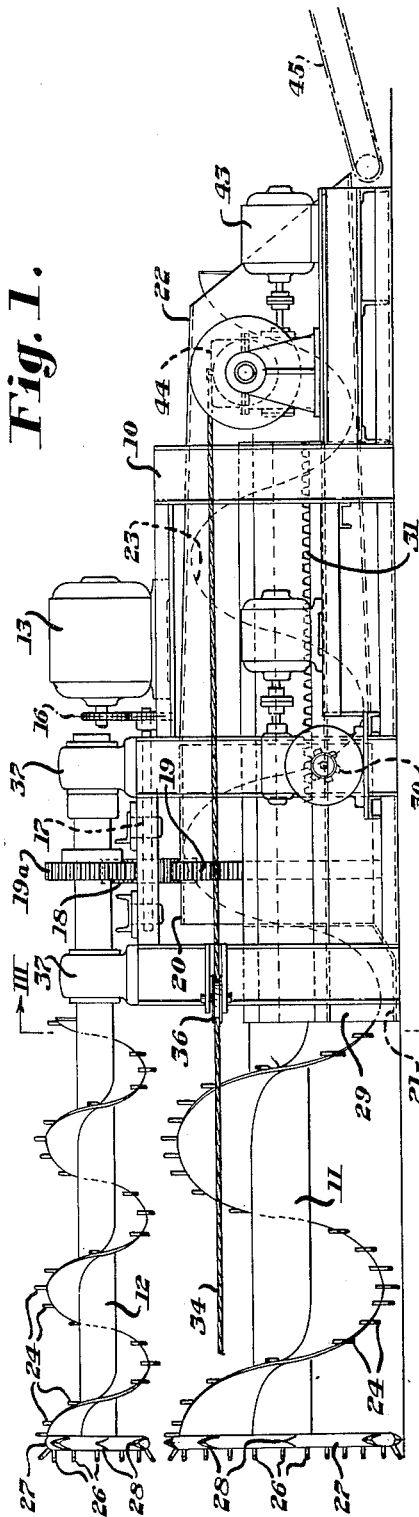
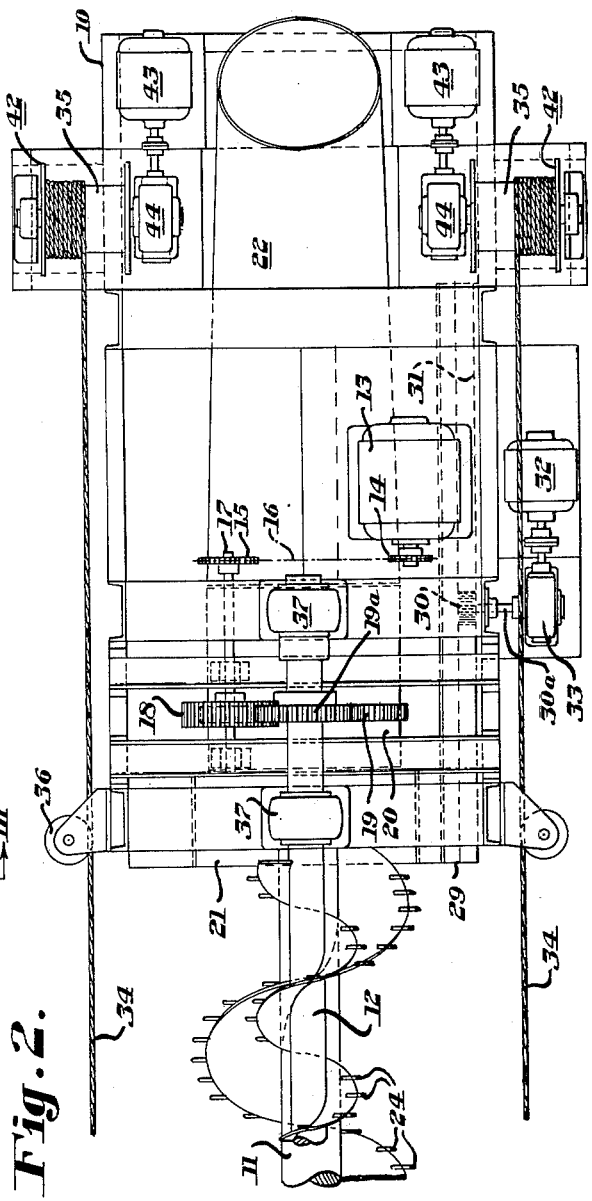
INVENTOR
Thomas H. Queer
his Attorneys Dec. 4, 1962 T. H. QUEER 3,066,924
AUGER TYPE MINING MACHINES
Filed Sept. 22, 1953 2 Sheets-Sheet 2

INVENTOR
Thomas H. Queer
his attorneys 3,066,924
AUGER TYPE MINING MACHINES
Thomas H. Queer, 1410 Browning Road, Pittsburgh 6, Pa.
Filed Sept. 22, 1953, Ser. No. 381,675
6 Claims. (Cl. 262—19)

This invention relates to mining machines and particularly to a mining machine adapted to cut and convey coal from low coal seams.

The so-called low coals, varying in thickness from seams of about 40 inches or less, represent a large part of our coal reserves. Many of these low coals are of a friable nature and are of good quality. These low seams, however, have not benefited from modern mechanization and modern machines are, in general, not adaptable to use in low mines. This, coupled with the generally more difficult conditions prevailing in handling any material in a confined space, has placed the low coal mines in a difficult competitive position and threatens this segment of the industry with extinction.

The present invention provides a machine which is low, short and compact and is adapted to working in low coal areas. In a preferred embodiment there is provided a mining machine comprising a movable frame, a pair of cutter conveyors rotatably mounted on the frame one above the other, means for rotating said cutter conveyors and means receiving the coal from said cutter conveyors and delivering it from the movable frame.

The bottom conveyor may be connected through a universal joint with a screw conveyor inclined upwardly to load the coal. A pneumatic conveyor or a belt conveyor may be substituted for the screw conveyor or connected to it to carry the coal back through the mine.

Preferably each of the cutter conveyors is provided along its full length and at the front end with cutting bits which are adapted to cut into the coal first in the manner of an auger and then across the face as a rotary cutting machine.

A retractible blade is preferably provided at each cutter conveyor to be inserted into the cut to enclose the loose coal around the conveyor during the traversing movement of the cutter across the coal face and to act as a transfer trough during the "sumping in" operation.

Each cutter conveyor is preferably mounted on the frame so as to be readily detachable and so as to be separable by varying distances to permit removal of coal above and below a binder formation. The auger cutters may be separated by shims or spacers in conventional manner used for separating parallel shafts. In some cases it may be necessary to interchange the gears on the upper auger cutter in conventional manner when separating the cutters.

Means are provided for moving the frame along the face of the coal seam. Preferably the machine is constructed to permit the frame to slide along the mine floor in front of the face of the coal seam and cable means are provided for pulling the frame along the floor.

Certain salient features of my invention have been mentioned above, however, other details, objects and advantages of the invention will become apparent as the following description of a presently preferred embodiment thereof proceeds.

In the accompanying drawings, I have shown a present preferred embodiment of the invention in which FIGURE 1 is a side elevational view of a mining machine according to my invention;

FIGURE 2 is a partial top plan view of FIGURE 1;

Figure 3:
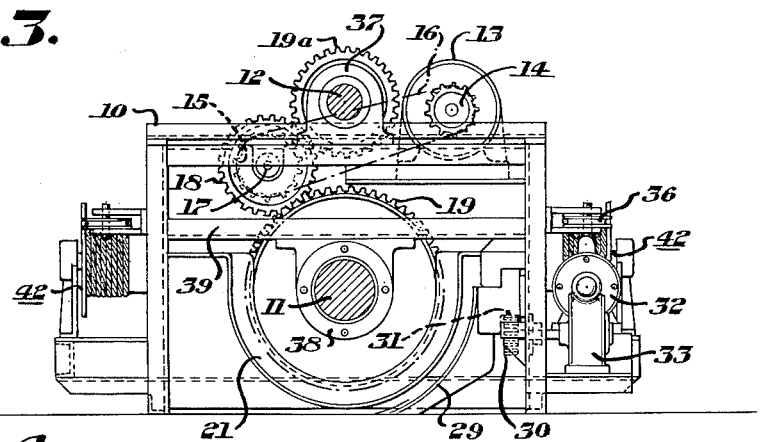
FIGURE 3 is a section on the line III—III of FIGURE 1 having the augers omitted for clarity.

Referring to the drawings I have illustrated a mining machine having a frame 10 adapted to be moved across the face of a coal seam to be mined. A pair of conveyor cutters 11 and 12 are journaled in the frame one above the other. The bottom conveyor cutter 11 is preferably larger in diameter than the upper cutter 12 in order to permit the lower cutter to convey coal falling from the upper cutter or breaking down between the cutter conveyors. A drive motor 13 having a sprocket 14 keyed to its shaft drives sprocket 15 keyed to shaft 17 through chain 16. Shaft 17 is journaled in pillow blocks and has a pinion gear 18 fixed thereon which drives the lower conveyor through a ring gear 19 and the upper conveyor through a spur gear 19a. The ring gear 19 is preferably constructed with a transfer sleeve 20 which rotates between and cooperates with a transfer trough 21 at the rear end of the lower cutter conveyor and a transfer trough 22 within the frame of the machine to form an essentially continuous trough. The lower cutter conveyor terminates at the front of the frame and is connected to a screw conveyor 23 passing through the ring gear 19. Conveyor cutter 12 is journaled in the frame 10 by pillow blocks 37 mounted on the top frame members and having combination radial and thrust bearings therein. Conveyor cutter 11 is supported at its forward end, i.e., immediately behind the cutting portion of the conveyor by an inverted pillow block and bearing 38 fixed to frame member 39, leaving a clear path for the mined coal. The rear portion of the conveyor cutter 11 is supported by a spider bearing 40 having radial legs 41 extending through the transfer trough 22 fastened to the main frame 10. The two lower legs 41 viewing FIGURE 4 aid in the crushing of the coal as it passes through the reduced throat of the transfer trough 22.

Each of the cutter conveyors 11 and 12 is provided along its outer edge with cutting teeth 24 which cut into the coal seam along the entire length of the cutter conveyor. Each cutter conveyor is also provided with a cutting head in the form of a spider made up of spaced radial members 25 carrying cutting teeth 26. Ring 27 having V-shaped cutting means 28 thereon is attached to the outer ends of the radial members 25. Cutters 28 clear a path for transverse movement of the ring 27 through the coal.

A retractible blade 29 is provided on the frame adjacent the cutter conveyor 11. The blade is advanced and retracted into the opening formed by the cutter conveyor 11 alongside the cutter conveyor in order to guide the coal along the conveyor spiral into the transfer trough as the machine is sumping in and being drawn along the face of the coal seam. The blade is advanced and retracted by a pinion gear 30 engaging a rack 31 on the rear of the blade. The pinion 30 is mounted on a shaft 30a journaled in the frame and driven by the motor 32 through a speed reducer 33.

The base of the frame is constructed so as to permit the mechanism to be drawn along the face of the coal seam on the mine floor paralleling the face of the coal. This may be accomplished by providing skids or other suitable means. A cable 34 is wound on a drum 35 mounted on the frame 10. The free end of the cable is fixed at the extreme end of the desired passage of the mining machine and the machine is moved along the mine floor by winding up the cable on the drum 35. The cable is threaded through sheaves 36 mounted at the forward end of the frame 10 allowing the cable to extend straight through while the machine is being sumped in, and later extended parallel to the face of the seam for transverse movement of the machine.

Figure 4:
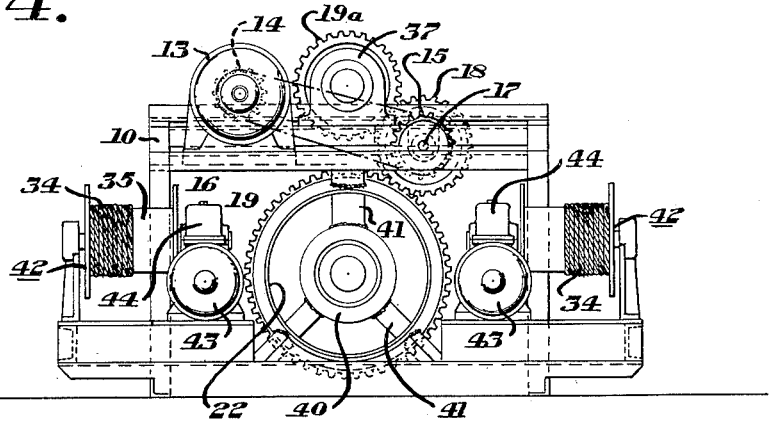
FIGURE 4 is a rear elevation of the mining machine of FIGURE 1.
Figure 5:
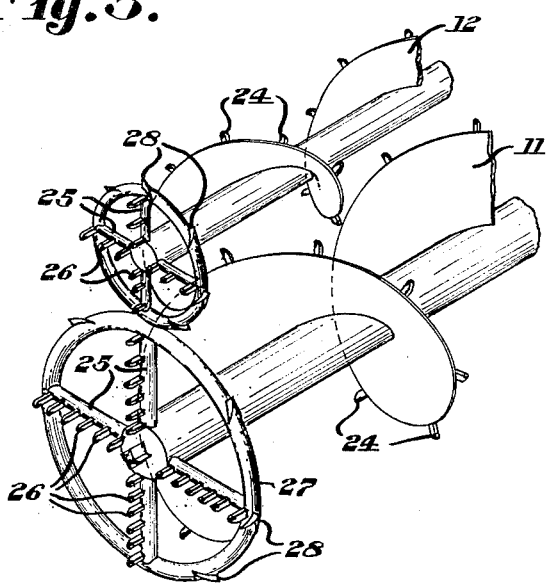
FIGURE 5 is an isometric view of the forward portions of the augers showing cutting means and conveying means.

The winches 42 are mounted slightly outboard of the main frame 10 viewing FIGURES 2, 3 and 4 and are driven by reversible motors 43 through speed reducers 44. The motors 43 are controlled either synchronously or independently depending upon the operation being performed. They are synchronous while sumping in and operate independently while pulling the machine across the face of the seam being mined, one paying out cable while the other pulls in cable.

In operating the mining machine of this invention, the machine is placed adjacent one end of the face to be mined with the front of the machine paralleling the face. The machine is moved toward the face as the cutter conveyors 11 and 12 are sumped into the face of the coal with the teeth 25 cutting a pair of cylindrical openings into the coal. When the cutter conveyors are sumped in, the machine is drawn along the face of the seam by the cable 34 and the teeth 24 on the edge of the cutter conveyors, remove the coal and carry it back to the transfer trough 21 from which it is carried through the ring gear 19 by sleeve 20 to the screw conveyor 23 which crushes the coal and in turn carries the coal to a belt conveyor 45.

When operating in coal seams having an intermediate binder seam of slate or rock it is possible to space the two cutter conveyors apart by a distance equal to the binder seam and thus mine the coal on either side without removing the binder. The binder can then be broken down and removed without contaminating the coal.

While I have illustrated and described a presently preferred embodiment of my invention it will be understood that it may be otherwise embodied within the scope of the following claims.

I claim:

1. A continuous mining machine comprising a frame; means carried by said frame for progressively cutting material in a mine longitudinally inwardly from a face thereof to form an opening of substantial horizontal depth while simultaneously conveying the longitudinally cut material longitudinally outwardly of the mine face and subsequently progressively cutting the material between the mine face and the inner end of the opening transversely to progressively enlarge the opening while simultaneously conveying the transversely cut material outwardly of the mine face until a room section is formed having a floor substantially in alignment with the bottom of said frame and a substantially horizontally extending roof spaced above said floor a distance greater than the height of said frame; said means comprising a pair of longitudinally extending auger cutters disposed forwardly of said frame having axes located in spaced horizontal planes, each of said auger cutters including a helical blade, cutting means adjacent the forward ends of said blades, and a plurality of spaced teeth extending outwardly from the peripheral edge of said blades, means connected with said frame for effecting longitudinal and transverse movement of said cutters with respect to the mine face, means on said frame operatively connected with said cutters for rotating the same about their axes, the highest point of said frame being lower than the highest point of the upper periphery of the upper cutter and the lowest point of said frame being substantially in alignment with the lowest point of the lower periphery of the lower cutter, and conveyor means carried by said frame for moving rearwardly of the same the mine material broken up and moved rearwardly of the mine face by said auger cutters.

2. A continuous mining machine comprising a frame, means carried by said frame for progressively cutting material in a mine longitudinally inwardly from a face thereof to form an opening of substantial horizontal depth while simultaneously conveying the longitudinally cut material longitudinally outwardly of the mine face and subsequently progressively cutting the material between the mine face and the inner end of the opening transversely to progressively enlarge the opening while simultaneously conveying the transversely cut material outwardly of the mine face until a room section is formed having a floor substantially in alignment with the bottom of said frame and a substantially horizontally extending roof spaced above said floor a distance greater than the height of said frame, said means comprising a pair of longitudinally extending auger cutters disposed forwardly of said frame having axes located in spaced horizontal planes, each of said auger cutters including a helical blade, cutting means adjacent the forward ends of said blades, and a plurality of spaced teeth extending outwardly from the peripheral edge of said blades, means connected with said frame for effecting longitudinal and transverse movement of said cutters with respect to the mine face, means on said frame operatively connected with said cutters for rotating the same about their axes, the highest point of said frame being lower than the highest point of the upper periphery of the upper cutter and the lowest point of said frame being substantially in alignment with the lowest point of the lower periphery of the lower cutter, and screw conveyor means carried within said frame substantially on the axis of the lower cutter for moving rearwardly of the same the mine material broken up and moved rearwardly of the mine face by said auger cutters.

3. A continuous mining machine comprising a frame, means carried by said frame for progressively cutting material in a mine longitudinally inwardly from a face thereof to form an opening of substantial horizontal depth while simultaneously conveying the longitudinally cut material longitudinally outwardly of the mine face and subsequently progressively cutting the material between the mine face and the inner end of the opening transversely to progressively enlarge the opening while simultaneously conveying the transversely cut material outwardly of the mine face until a room section is formed having a floor substantially in alignment with the bottom of said frame and a substantially horizontally extending roof spaced above said floor a distance greater than the height of said frame, said means comprising a pair of longitudinally extending auger cutters, separable by varying distances, disposed forwardly of said frame and having axes located in spaced horizontal planes, each of said auger cutters including a helical blade, cutting means adjacent the forward ends of said blades, and a plurality of spaced teeth extending outwardly from the peripheral edge of said blades, means connected with said frame for effecting longitudinal and transverse movement of said cutters with respect to the mine face, means on said frame operatively connected with said cutters for rotating the same about their axes, the highest point of said frame being lower than the highest point of the upper periphery of the upper cutter and the lowest point of said frame being substantially in alignment with the lowest point of the lower periphery of the lower cutter, and conveyor means carried by said frame for moving rearwardly of the same the mine material broken up and moved rearwardly of the mine face by said auger cutters.

4. A continuous mining machine comprising a frame, means carried by said frame for progressively cutting material in a mine longitudinally inwardly from a face thereof to form an opening of substantial horizontal depth while simultaneously conveying the longitudinally cut material longitudinally outwardly of the mine face and subsequently progressively cutting the material between the mine face and the inner end of the opening transversely to progressively enlarge the opening while simultaneously conveying the transversely cut material outwardly of the mine face until a room section is formed having a floor substantially in alignment with the bottom of said frame and a substantially horizontally extending roof spaced above said floor a distance greater than the height of said frame, said means comprising a pair of longitudinally extending auger cutters, separable by varying distances, disposed forwardly of said frame and having axes located in spaced horizontal planes, each of said auger cutters including a helical blade, cutting means adjacent the forward ends of said blades, and a plurality of spaced teeth extending outwardly from the peripheral edge of said blades, means connected with said frame for effecting longitudinal and transverse movement of said cutters with respect to the mine face, means on said frame operatively connected with said cutters for rotating the same about their axes, the highest point of said frame being lower than the highest point of the upper periphery of the upper cutter and the lowest point of said frame being substantially in alignment with the lowest point of the lower periphery of the lower cutter, and conveyor means carried within said frame for moving rearwardly through of the same the mine material broken up and moved rearwardly of the mine face by said auger cutters.

5. A continuous mining machine comprising a frame, means carried by said frame for progressively cutting material in a mine longitudinally inwardly from a face thereof to form an opening of substantial horizontal depth while simultaneously conveying the longitudinally cut material longitudinally outwardly of the mine face and subsequently progressively cutting the material between the mine face and the inner end of the opening transversely to progressively enlarge the opening while simultaneously conveying the transversely cut material outwardly of the mine face until a room section is formed having a floor substantially in alignment with the bottom of said frame and a substantially horizontally extending roof spaced above said floor a distance greater than the height of said frame, said means comprising a pair of longitudinally extending auger cutters disposed forwardly of said frame having axes located in spaced horizontal planes, each of said auger cutters including a helical blade, cutting means adjacent the forward ends of said blades, and a plurality of spaced teeth extending outwardly from the peripheral edge of said blades, means connected with said frame for effecting longitudinal and transverse movement of said cutters with respect to the mine face, means on said frame operatively connected with said cutters for rotating the same about their axes, the highest point of said frame being lower than the highest point of the upper periphery of the upper cutter and the lowest point of said frame being substantially in alignment with the lowest point of the lower periphery of the lower cutter, a retractible blade means movable outwardly from the frame parallel to and alongside the lower cutter along its length to retain cut coal in contact with said lower cutter, and conveyor means carried by said frame for moving rearwardly of the same the mine material broken up and moved rearwardly of the mine face by said auger cutters.

6. A continuous mining machine comprising a frame, means carried by said frame for progressively cutting material in a mine longitudinally inwardly from a face thereof to form an opening of substantial horizontal depth while simultaneously conveying the longitudinally cut material longitudinally outwardly of the mine face and subsequently progressively cutting the material between the mine face and the inner end of the opening transversely to progressively enlarge the opening while simultaneously conveying the transversely cut material outwardly of the mine face until a room section is formed having a floor substantially in alignment with the bottom of said frame and a substantially horizontally extending roof spaced above said floor a distance greater than the height of said frame, said means comprising a pair of longitudinally extending auger cutters, separable by varying distances, disposed forwardly of said frame and having axes located in spaced horizontal planes, each of said auger cutters including a helical blade, cutting means adjacent the forward ends of said blades, and a plurality of spaced teeth extending outwardly from the peripheral edge of said blades, means connected with said frame for effecting longitudinal and transverse movement of said cutters with respect to the mine face, means on said frame operatively connected with said cutters for rotating the same about their axes, the highest point of said frame being lower than the highest point of the upper periphery of the upper cutter and the lowest point of said frame being substantially in alignment with the lowest point of the lower periphery of the lower cutter, a retractible blade means movable outwardly from the frame parallel to and alongside the lower cutter along its length to retain cut coal in contact with said lower cutter, and conveyor means carried by said frame for moving rearwardly of the same the mine material broken up and moved rearwardly of the mine face by said auger cutters.

References Cited in the file of this patent

UNITED STATES PATENTS

| | | |
|---|---|---|
| 355,284 | Walton | Dec. 28, 1886 |
| 748,530 | Robinson et al. | Dec. 29, 1903 |
| 966,377 | Barker | Aug. 2, 1910 |
| 966,378 | Barker | Aug. 2, 1910 |
| 1,006,213 | Hess | Oct. 17, 1911 |
| 1,032,902 | Hess | July 16, 1912 |
| 1,160,660 | Secrist | Nov. 16, 1915 |
| 1,336,440 | O'Toole | Apr. 13, 1920 |
| 1,653,111 | Lobbey | Dec. 20, 1927 |
| 1,726,438 | Knorr | Aug. 27, 1929 |
| 2,165,666 | Tilly | July 11, 1939 |
| 2,575,975 | Robbins | Nov. 20, 1951 |
| 2,592,996 | Anderson | Apr. 15, 1952 |
| 2,616,677 | Compton | Nov. 4, 1952 |
| 2,702,180 | Horner | Feb. 15, 1955 |

FOREIGN PATENTS

| | | |
|---|---|---|
| 512,542 | Belgium | July 31, 1952 |
| 560,813 | France | July 19, 1923 |
| 322,894 | Germany | July 10, 1920 |
| 177,813 | Great Britain | Apr. 13, 1922 |
| 647,870 | Great Britain | Dec. 20, 1950 |

OTHER REFERENCES

"Coal Age," December 1948, pages 84–87.